(12) United States Patent
Nickerson et al.

(10) Patent No.: US 6,243,891 B1
(45) Date of Patent: Jun. 12, 2001

(54) WATER HANDLING SYSTEM AND VALVE

(76) Inventors: Jack A. Nickerson, 1958 Groveland Rd., Palm Harbor, FL (US) 34683; Jack A. Nickerson, Jr., 6610 Waterman Ave., St. Louis, MO (US) 63130

( * ) Notice: Subject to any disclaimer, the term of this patent is extended or adjusted under 35 U.S.C. 154(b) by 0 days.

(21) Appl. No.: 09/542,810

(22) Filed: Apr. 4, 2000

(51) Int. Cl.⁷ .................................. A47K 3/12; E03C 3/12
(52) U.S. Cl. .......................... 4/661; 4/638; 4/597; 4/605
(58) Field of Search ................................ 4/661, 638, 597, 4/605, 668, 546, 559; 239/445, 446, 586, 124, 75; 137/337, 872; 236/93 R, 93 B, 99 K, 100, 12.15, 12.17, 12.11

(56) References Cited

U.S. PATENT DOCUMENTS

| | | | | |
|---|---|---|---|---|
| 2,534,378 | * | 12/1950 | Schlaich | 236/93 R |
| 4,410,133 | * | 10/1983 | Furukubo | 236/34.5 |
| 4,854,499 | * | 8/1989 | Neuman | 236/93 B |
| 5,205,318 | * | 4/1993 | Massaro et al. | 137/337 |
| 5,493,739 | * | 2/1996 | Bezdek | 4/663 |
| 5,788,160 | * | 8/1998 | Woog | 239/282 |
| 5,794,643 | * | 8/1998 | Brice | 137/14 |
| 6,032,687 | * | 3/2000 | Linn | 137/337 |
| 6,032,877 | * | 3/2000 | Kagan | 239/446 |

* cited by examiner

Primary Examiner—Gregory L. Huson
Assistant Examiner—Huyen Le

(57) ABSTRACT

A valve includes a housing with an input for unheated water and an output for delivering unheated water to a toilet tank and a supplemental input for cooled and hot water in. The valve has a thermally responsive component to open and close the supplemental input.

3 Claims, 3 Drawing Sheets

WATER HANDLING SYSTEM AND VALVE

BACKGROUND OF THE INVENTION

1. Field of the Invention

The present invention relates to a water handling system and valve and more particularly pertains to conserving water use and providing immediate hot water for a bathroom without wasting water down the drain for the purpose of drawing off cooled water in the hot water pipes.

2. Description of the Prior Art

The use of water handling systems and valves is known in the prior art. More specifically, water handling systems and valves previously devised and utilized for the purpose of conserving water use and providing immediate hot water for a bathroom are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,885,584 to Hock discloses a hot water system. U.S. Pat. No. 4,162,218 to McCormick discloses a water reuse system. U.S. Pat. No. 4,285,465 to North discloses thermostatis devices. U.S. Pat. No. 4,453,668 to Abel discloses a fail-safe thermostatic valve. U.S. Pat. No. 4,606,370 to Geipel et al. discloses a flow-switching water-mixing faucet assembly. U.S. Pat. No. 4,854,499 to Neuman discloses a temperature sensitive shower diverter valve and method for diverting shower water. U.S. Pat. No. 4,872,476 to Pflum discloses a check valve for engine cooling system. U.S. Pat. No. 4,905,732 to Bright et al. discloses a modular pressure balanced valve assembly. U.S. Pat. No. 5,009,572 to Imhoff et al. discloses a water conservation device. U.S. Pat. No. 5,261,443, to Walsh discloses a watersaving recirculating system. U.S. Pat. No. 5,603,344 to Hall, Jr., discloses an apparatus for recovering and saving chilled water in hot water lines having adjustable thermostatic control. U.S. Pat. No. 5,690,276 to Thiel, et al discloses a two stage thermostatic valve device. U.S. Pat. No. 5,794,643, to Brice discloses a pressure regulated diverting apparatus and method for water conservation. U.S. Pat. No. 5,018,664 to Butler discloses a thermostat having soft mounting structure. U.S. Pat. No. 5,829,467 to Spicher discloses a residential hot water circulation system and associated method. Lastly, U.S. Pat. No. 5,845,346 to Johnson, Jr. discloses a water recycling system.

While these devices fulfill their respective, particular objectives and requirements, the aforementioned patents do not describe a water handling system and valve that conserves water use and provides immediate hot water for a bathroom and kitchen if it is between the hot water tank and the bathroom.

In this respect, the water handling system and valve according to the present invention substantially departs from the conventional concepts and designs of the prior art, and in doing so provides an apparatus primarily developed for the purpose of conserving water use and providing immediate hot water for a bathroom.

Therefore, it can be appreciated that there exists a continuing need for a new and improved water handling system and valve which can be used for conserving water use and providing immediate hot water for a bathroom. In this regard, the present invention substantially fulfills this need.

SUMMARY OF THE INVENTION

In view of the foregoing disadvantages inherent in the known types of water handling systems and valves now present in the prior art, the present invention provides an improved water handling system and valve. As such, the general purpose of the present invention, which will be described subsequently in greater detail, is to provide a new and improved water handling system and valve and method which has all the advantages of the prior art and none of the disadvantages.

To attain this, the invention essentially comprises a new and improved water handling system that conserves water use and provides immediate hot water for a bathroom including a shower with a showerhead. The showerhead has an input end for receiving hot water and cold water from sources. The showerhead also has a primary output for the dispensing of the input water in a normal showering fashion. The showerhead also has supplemental outlets. The supplemental outlets include an upwardly directed flow line and a lower directed weep stream. The outlets are singular and the weep is external to the bypass valve. The weep is drilled in the elbow at the proper angle. The bypass valve is preferably an off-the-shelf valve. The showerhead has a deflector for directing water through the primary output from the input end when in a first orientation and for directing water through the supplemental outlets from the input end when in a second orientation. The orientation is at the discretion of the user. A valve is next provided. The valve has a first orifice for cold water and a second orifice for delivering water to a toilet. The first and second orifices have axes in a first common direction. The valve also has a third orifice for hot water in and a fourth orifice for the receipt of water from a holding tank. The third and fourth orifices have axes in a second common direction. The valve has a thermally responsive component to block off a cold water flow from the first orifice and from the fourth orifice until the third orifice becomes heated from the flow of hot water and shuts off the hot water line. A holding tank is provided. The holding tank is positioned above the showerhead, preferably in the attic. The holding tank is adapted to receive water from the showerhead. A check valve is provided in the line adjacent to the water tank. A water outlet line is provided. The water outlet line extends from the holding tank to the fourth orifice. A check valve is provided in the outlet line adjacent to the holding tank. An overflow line is provided from the holding tank to the shower stall which is a discharge region. The thermal valve could operate separately with or without the attic tank and the bypass valve.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved water handling system and valve which has all of the advantages of the prior art water handling systems and valves and none of the disadvantages.

It is another object of the present invention to provide a new and improved water handling system and valve which may be easily and efficiently manufactured and marketed.

It is further object of the present invention to provide a new and improved water handling system and valve which is of durable and reliable constructions.

An even further object of the present invention is to provide a new and improved water handling system and valve which is susceptible of a low cost of manufacture with regard to both materials and labor, and which accordingly is then susceptible of low prices of sale to the consuming public, thereby making such water handling system and valve economically available to the buying public.

Even still another object of the present invention is to provide a hot water at the bathroom sink or shower nozzle while eliminating water treatment sewer costs and wasting water down the drain while waiting for hot water to reach the tap or nozzle.

Older toilets take about 3.5 gallons to flush, newer ones about 1.6 gallons. The amount of cooled hot water that is drained from the hot water line is a function of the size of the pipe which is generally ½ inches in diameter and the distance from the hot water heater. It can vary from ¾ gallons to 1.5 gallons or more depending on the routing of the copper pipes and the size of the house.

The invention has two purposes and two parts. The first part will work by itself and the second part supplements the first. The first part is to provide hot water at the bathroom sink tap just after the toilet is used and flushed. Also at the same time it will provide hot water at the kitchen sink tap, assuming the kitchen is closer to the hot water heating tank than the bathroom. This will eliminate losing any water down the drain. The water in the hot water line coming from the hot water tank has cooled and must be drawn off to get hot water at the bathroom sink tap. Approximately 1.6 to 2.5 gallons of water are required to flush the toilet. The first ¾ to 1 ½ gallons of water that flows to refill the flush tank comes from the cooled water that is in the hot water line. When the water becomes hot in the hot water line, the thermal actuator indirectly shuts off the flow of water from the hot water line and opens the cold water line from the city. Note that the fourth orifice of the hot/cold shut off valve is plugged in the first phase and not used. All cold water comes from the city that finishes filling the flush tank and comes through the exit shut off valve to the water closet.

The second part of the invention occurs when the weep and by-pass valve is installed along with a closed tank and relative piping and check valves. Also, the city water shut off valve located under the flush tank to the toilet is turned off. The plug at the third orifice is removed and the piping from that point to the tank above the ceiling is installed. The weep and bypass valve is shiftable between a bypass position and a non-bypass position. When the hot and cold shower valve or mixing valve are opened to prepare for showering, the improper temperature water by-passes to the storage tank above. The weep hole continually squirts a small amount of water into the shower area. The weep hole is drilled in the elbow looking down. When the person taking the shower finds the proper temperature, they push the knob for the weep in and by-pass valve and the full shower starts. The water pressure holds the know in position until the water is shut off. It takes between 40 seconds and 1 minute and 30 seconds to get the right temperature. At 2.5 gallons per minutes (maximum flow rate) for shower heads, the showerer bypasses between 1.6 gallons to 3.7 gallons to the storage tank above. The annual usage for two people translated to 1,168 gallons to 2,701 gallons. Every time the toilet is flushed the remaining water comes from the closed tank above. The remaining water that fills the flush tank comes by gravity from the storage tank located above the ceiling. The storage has an overflow pipe that goes back to the shower in case the tank is totally filled. If the storage tank is empty, the flush tank will be filled by the hot water line as it cools and the hot/cold valve resets itself or cracking open the shut off valve.

The savings in water consumption for a two people per year for part 1 is approximately 2,700 gallons per year plus the convenience of having hot water at the tap at the essential time of the day. This is based upon the assumption that there are a minimum of three flushes per person per day with the distance for the heater and the size of the pipe being governing factors. Part 2 could provide an additional 1,314 gallons of water conservation for a family of two people using 1.6 gallon toilets but could increase to (3.5−1)×6× 365=4,475 gallons for a 3.5 gallon toilet of the older variety. The invention uses no additional energy and has added benefits by the reduction of work required by sewer treatment plants and the hygiene of washing.

Showerheads, old style, are rated at about 3.5 gpm and new approved ones are rated at about 2.5 gpm maximum. The shower could be father away from the hot water heater and might take 20 seconds more to clear line of cooled hot water, plus the fact some people don't watch shower that closely. The annual savings for a 2.5 gallon nozzle based on the 40 seconds to 1 minute 30 seconds is 1.6 gallons per person and 3.7 gallons respectively. Note is taken that most people flush the toilet about 3 times a day minimum. The most water you could save is between 3 times a 1.6 gallon toilet tank to 3 times a 3.5 gallon tank. Which means 4.8×365×2 people=3,500 to 10.5×365×2=7,665 gallons.

Lastly, it is an object of the present invention to provide a new and improved valve including a housing with first orifice for cold water, a second orifice for delivery water to a toilet, and a third orifice for cooled water or hot water in and a fourth orifice for the holding tank. The valve has a thermally responsive component to block off a cold water flow from the first orifice or fourth orifice until the third orifice becomes heated from the flow of hot water.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
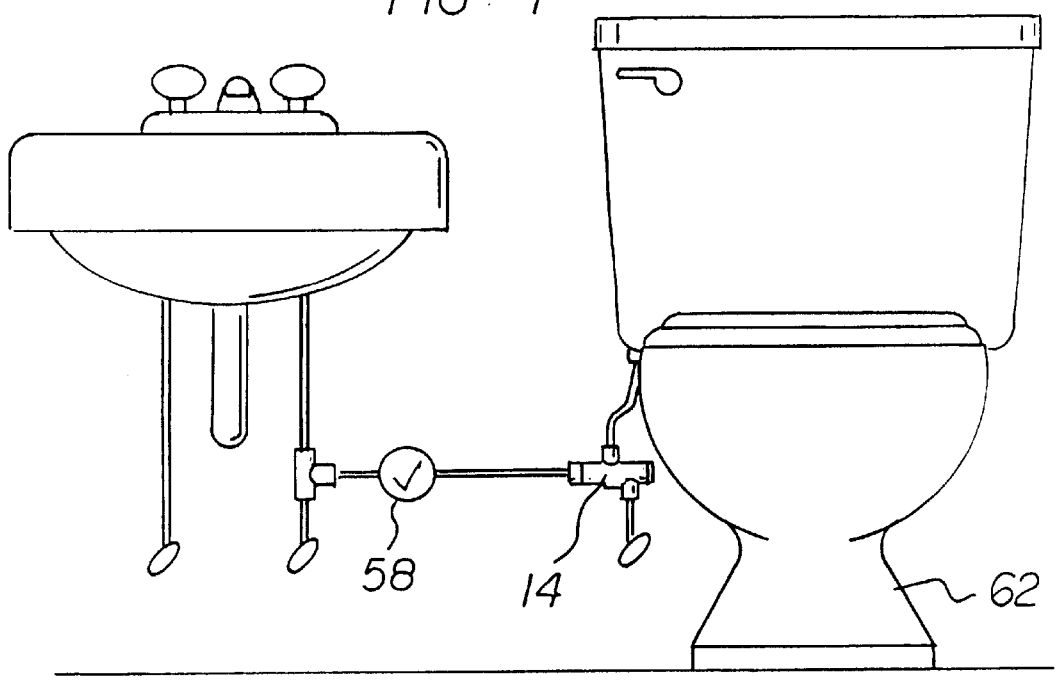
FIG. 1 is a front elevational view of the new and improved water handling system and valve constructed in accordance with the principles of the present invention.

With reference now to the drawings, and in particular to FIG. 1 thereof, the preferred embodiment of the new and improved water handling system and valve embodying the principles and concepts of the present invention and generally designated by the reference numeral 10 will be described.

The present invention, the water handling system and valve 10 is comprised of a plurality of components. Such components in their broadest context include a valve 14 having a housing with a first orifice 16, a second orifice 20, and a third orifice 22. Such components are individually configured and correlated with respect to each other so as to attain the desired objective.

First provided is a valve 14 located between the hot water line of the sink and the cold water line and the toilet. The valve has a first orifice 16 for cold water in from a cold water line 18. A second orifice 20 is provided for delivering water to a toilet tank. The first and second orifices have axes in a first common direction. A third orifice 22 is provided for cooled hot water and then hot water in from a hot water line 24. A fourth orifice 26 is provided for the receipt of water from a holding tank 28. The third and fourth orifices have axes in a second common direction. The valve has a thermally responsive component 30 with a first shoulder 32 to block off a cold water flow from the first orifice until the thermally responsive component becomes heated from the flow of hot water after the flow of cooled water. Such thermally resonsive component is commercially available and is of the type disclosed in U.S. Pat. Nos. 4,453,668; 4,872,476; 5,018,664 and 5,690,276 assigned to Caltherm Corporation, the subject matter of which is incorporated herein by reference. The valve also has a second shoulder 34 to block off the flow of hot water to the second orifice after the thermally responsive component becomes heated from the flow of hot water.

Figure 2:
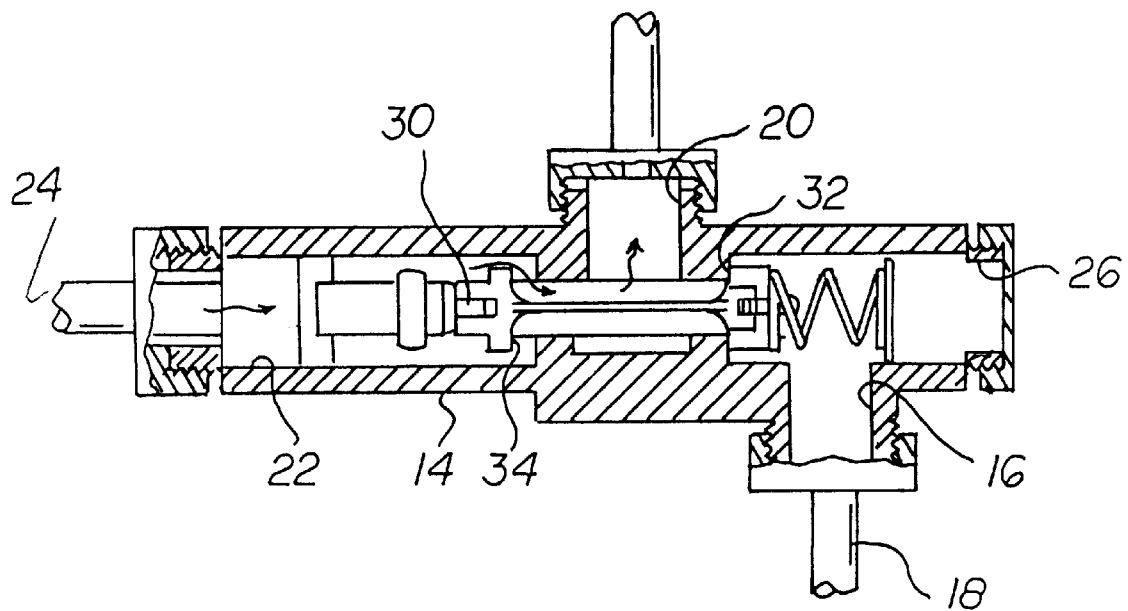
FIG. 2 is a cross sectional view of the valve shown in FIG. 1.
Figure 3:
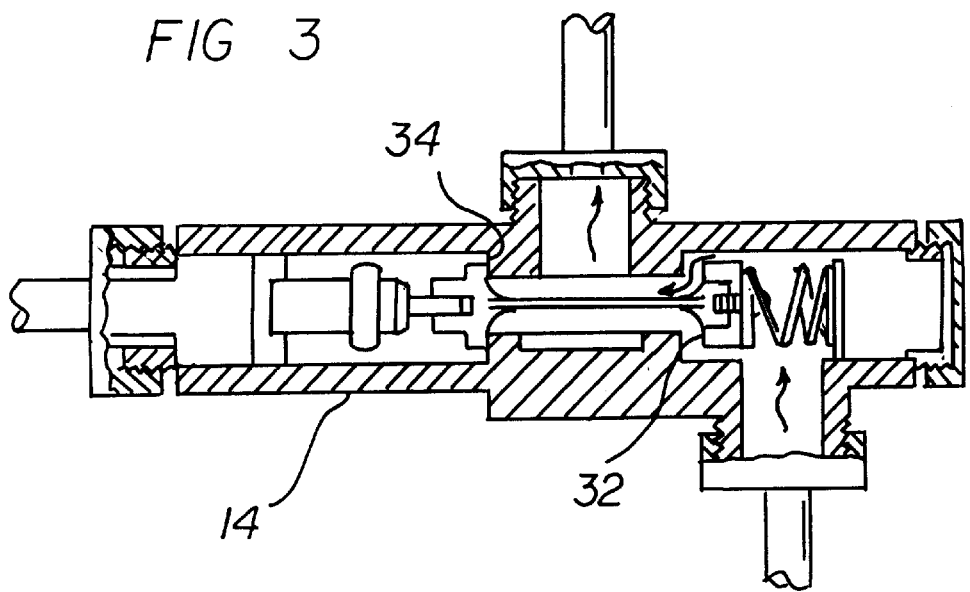
FIG. 3 is a view similar to FIG. 2 but showing an alternate orientation.

As can be seen by comparing FIGS. 2 and 3, water from the cold water line 18 is blocked from delivery to the toilet tank when the valve 14 is in the FIG. 2 orientation whereby cooled water will enter the third orifice from the hot water line until the water from the hot water line heats the thermally responsive component 30. Thereafter, the valve assumes the FIG. 3 orientation so that the toilet will be fed from the cold water line 18. A spring urges the thermally responsive component to the FIG. 2 orientation after cooling.

Figure 5:
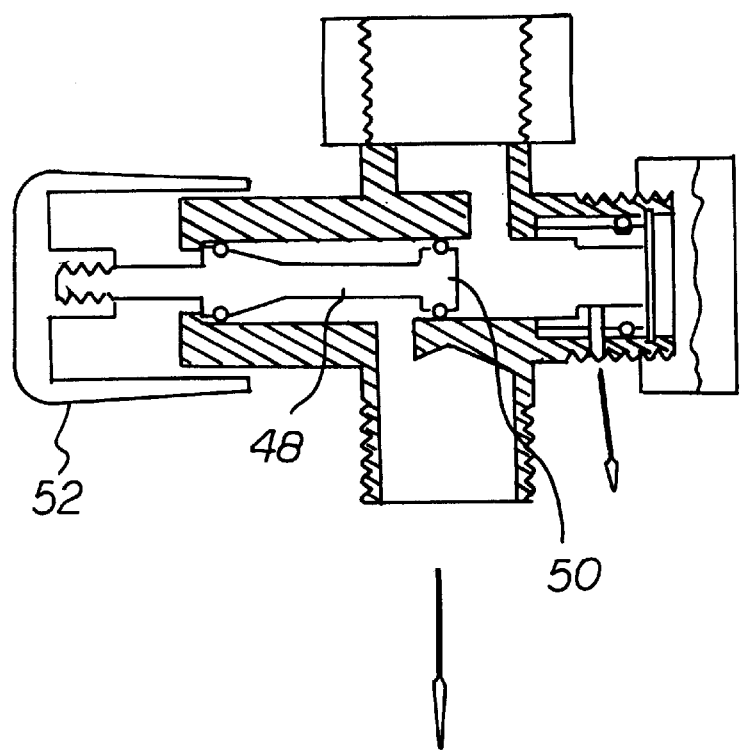
FIG. 5 is a cross sectional view of the shower bypass and weep valve of FIG. 4.
Figure 4:
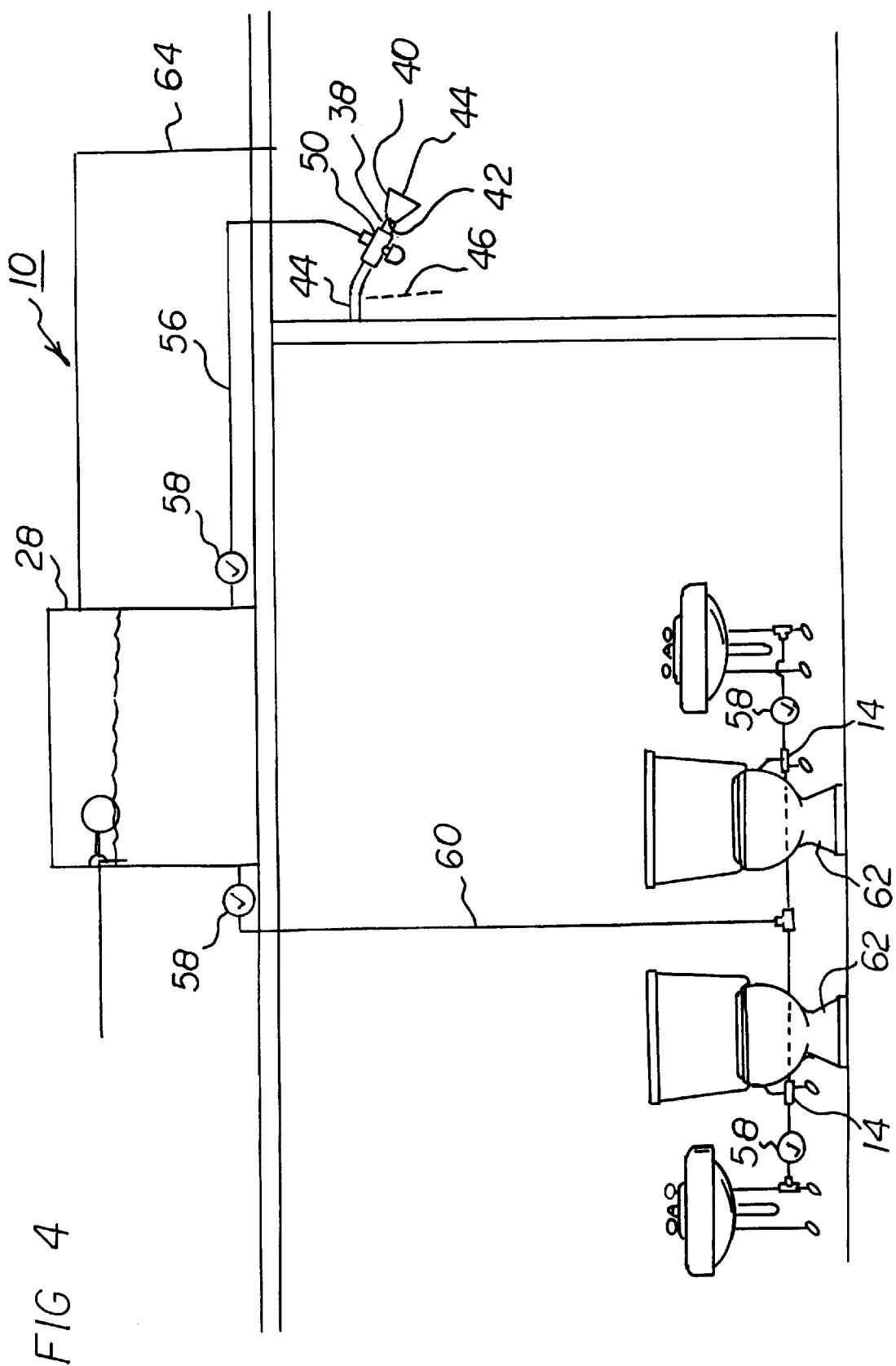
FIG. 4 is a front elevational view of an extended system employing the system and valve of the prior Figures.

A shower 38 is next provided. The shower has a showerhead 40. The showerhead has an input end 42 for receiving hot water and cold water from sources. The showerhead also has a primary outlet 44 for the dispensing of the input water in a normal showering fashion. The showerhead also has supplemental outlets. The supplemental outlets include an upwardly directed flow line 56 and a lower directed weep stream 46. The weep stream 46 may be formed in the valve 50 as shown in FIG. 5 or, preferably, be formed in the pipe of the shower in advance of the valve 50. The showerhead has a deflector 48 for directing water through the primary output from the input end when in a first orientation and for directing water through the supplemental outlets from the input end when in a second orientation. The orientation is determined at the discretion of the user by shifting of the defector 48 of the valve 50 through an operator controlled actuator 52.

A holding tank 28 is provided. The holding tank is positioned above the showerhead. The holding tank is adapted to receive water through a supply line 56 from the showerhead. A check valve 58 is provided in the line adjacent to the water tank. A water outlet line 60 is provided. The water outlet line extends from the holding tank to the fourth orifice for toilet flushing of one or more toilets. A check valve 58 is provided in the water outlet line adjacent to the holding tank. Additional check valves 58 are provided as needed for safe, efficient and sanitary operations, as for example, into and out of the holding tank 28 as well as between each sink cold water line and its associated valve 14.

Lastly, an overflow line 62 is provided from the holding tank to a discharge region.

In an alternate embodiment of the invention, it is possible to use the system with a holding tank not having an input for makeup water. It would rely totally on shower water for filling such tank. In such arrangement, the city water valve to the toilet would be opened to a limited extent only. In this manner, the input to the valve would be from the holding tank so long as there was water therein. The input to the toilet would, however, be the cold water in line when the holding tank was empty. This embodiment is acceptable wherein the shower and holding tank service a single toilet.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the united states is as follows:

1. A new and improved water handling system that conserves water use and provides immediate hot water for a bathroom comprising, in combination:

a valve having a first orifice for cold water in from a cold water line and a second orifice for delivering water to a toilet, the first and second orifices having axes in a first common direction, a third orifice for hot water in from a hot water line and a fourth orifice for the receipt of water from a holding tank, the third and fourth orifices having axes in a second common direction, the valve having a thermally responsive component with a first shoulder to block off a cold water flow from the first orifice or fourth orifice until the thermally responsive component becomes heated from the flow of hot water and a second shoulder to block off the flow of hot water to the first orifice after the thermally responsive component becomes heated from the flow of hot water;

a shower with a showerhead, the showerhead having an input end for receiving hot water and cold water from sources, a primary outlet for the dispensing of the input water in a normal showering fashion and supplemental outlets including an upwardly directed flow line and a lower directed weep stream, the showerhead having a deflector for directing water through the primary output from the input end when in a first orientation and for directing water through the supplemental outlets from the input end when in a second orientation, the orientation being at the discretion of the user by shifting of a valve through an actuator;

a holding tank positioned above the showerhead adapted to receive water through a supply line from the showerhead with a check valve in the line adjacent to the water tank and a water outlet line extending from the holding tank to the fourth orifice with a check valve therein adjacent to the holding tank; and an overflow line from the holding tank to a discharge region.

2. A water handling system for a bathroom comprising:

a shower with a showerhead, the showerhead having an input end for receiving hot water and cold water, a primary outlet for the dispensing of the input water in a normal showering fashion and supplemental outlets including an upwardly directed flow line and a lower directed weep stream, the showerhead having a deflector for directing water through the primary output from the input end when in a first orientation and for directing water through the supplemental outlets from the input end when in a second orientation, the orientation being at the discretion of the user;

a valve having a first orifice for cold water and a second orifice for delivering water to a toilet tank, a third orifice for hot water in and a fourth orifice for the receipt of water from a holding tank, the valve having a thermally responsive component to block off a cold water flow from the first orifice until the third orifice becomes heated from the flow of hot water;

a holding tank positioned above the showerhead adapted to receive water from the showerhead and a water outlet line extending from the holding tank to the fourth orifice.

3. A new and improved water handling valve system comprising, in combination:

a valve housing having a first orifice for cold water and a second orifice for delivering water to a toilet, the first and second orifices having axes in a first common direction, a third orifice for hot water in and a fourth orifice for the receipt of water from a holding tank, the third and fourth orifices having axes in a second common direction, the valve having a thermally responsive component to block off a cold water flow from the first orifice or fourth orifice until the third orifice becomes heated from the flow of hot water.

* * * * *